United States Patent
Zhao et al.

(10) Patent No.: US 6,790,272 B1
(45) Date of Patent: Sep. 14, 2004

(54) DISPERSION RESINS CONTAINING ITACONIC ACID FOR IMPROVING WET ABRASION RESISTANCE

(75) Inventors: Cheng-Le Zhao, Schwetzingen (DE); Joachim Roser, Brüssel (BE); Rolf Dersch, Neustadt (DE); Roland Baumstark, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,487

(22) PCT Filed: Mar. 15, 1999

(86) PCT No.: PCT/EP99/01690

§ 371 (c)(1),
(2), (4) Date: Sep. 15, 2000

(87) PCT Pub. No.: WO99/47611

PCT Pub. Date: Sep. 23, 1999

(30) Foreign Application Priority Data

Mar. 16, 1998 (DE) .......................... 198 11 314

(51) Int. Cl.$^7$ .......................... C09D 5/02; C09D 17/00; C09D 7/12; C09D 151/00
(52) U.S. Cl. .............................. 106/286.8; 106/287.35; 524/460; 524/555; 524/556
(58) Field of Search ........................ 106/286.8, 287.35; 524/460, 555, 556

(56) References Cited

U.S. PATENT DOCUMENTS

| 3,887,408 A | 6/1975 | Hoey |
| 3,896,085 A | 7/1975 | Larsson et al. |
| 3,901,240 A | 8/1975 | Hoey |
| 4,000,028 A | 12/1976 | Hoey |
| 4,016,127 A | 4/1977 | Larsson et al. |
| 4,107,120 A * | 8/1978 | Plamondon et al. . 260/29.6 RB |
| 4,181,769 A | 1/1980 | Plamondon et al. |
| 5,118,749 A * | 6/1992 | Knutson ..................... 524/460 |
| 5,175,205 A | 12/1992 | Yang |
| 5,455,298 A * | 10/1995 | Farwaha et al. ............. 524/612 |
| 5,468,800 A * | 11/1995 | Fölsch et al. ................ 524/458 |
| 5,681,880 A * | 10/1997 | Désor et al. ................. 524/320 |
| 5,905,114 A * | 5/1999 | Baumstark et al. ......... 524/801 |

FOREIGN PATENT DOCUMENTS

| CA | 2189889 | 5/1997 | |
| DE | 22 32 710 | 1/1973 | |
| DE | 24 18 849 | 11/1974 | |
| DE | 27 26 806 | 12/1977 | |
| DE | 195 42 077 | 5/1997 | |
| EP | 0 225 611 | 6/1987 | |
| EP | 709 441 | * 5/1996 | ................. 524/320 |
| EP | 0 773 245 | 5/1997 | |
| EP | 0 810 274 | 12/1997 | |
| WO | WO 93/11181 | 6/1993 | |

OTHER PUBLICATIONS

Ullmans Enzykopädie der technischen Chemie, vol. 15, pps. 668–670, "LACKE" (only portion in English has been considered).

* cited by examiner

Primary Examiner—Kelechi C. Egwim
(74) Attorney, Agent, or Firm—Oblon, Spivak, McClelland, Maier & Neustadt, P.C.

(57) ABSTRACT

The invention relates to aqueous pigment preparations containing i) at least one copolymer P of ethylenically unsaturated monomers M in the form of an aqueous polymer dispersion which contains between 0.1 and 1.5 weight %, in relation to the total weight of the copolymer P, of polymerized itaconic acid as acid monomer M1, its salts and/or anhydride, where up to 50 weight % of the itaconic acid can be substituted by another monomer having at least one acid group or a neutralized acid group, and whose glass transition temperature $T_G$ lies between –10 and +50° C.; ii) at least one inorganic pigment; iii) possibly inorganic fillers; and iv) standard additives. The invention also relates to the use of the copolymers P containing itaconic acid for improving the wet-abrasion resistance of polymer-bound coatings containing pigments.

37 Claims, No Drawings

DISPERSION RESINS CONTAINING ITACONIC ACID FOR IMPROVING WET ABRASION RESISTANCE

The present invention relates to pigment-comprising aqueous formulations which comprise at least one aqueous addition-polymer dispersion.

Pigmented formulations are employed widely in the form of coating compositions, especially emulsion paints, synthetic-resin-bound plasters (dispersion plasters), sealing compounds or filling compositions for purposes of architectural protection or decoration. Pigmented formulations generally include as their binder a film-forming polymer, at least one inorganic pigment and, if desired, one or more inorganic fillers/extenders, and customary auxiliaries. The quality of the coatings formed from pigmented formulations depends critically on the ability of the film-forming polymer to carry out uniform binding of the nonfilm-forming constituents, the pigments and the inorganic fillers.

A low pigment binding capacity leads to poor mechanical stability of the coating, which is manifested, for example, in a low wet abrasion resistance. The desire, however, is for high wet abrasion resistance, especially in the case of washable emulsion paints.

The pigment binding capacity of the binder plays a particularly important part in formulations having a moderate to high content of inorganic pigments and fillers/extenders. A characteristic parameter of the pigment content of a polymer-bound coating composition is the pigment volume concentration pvc. The pvc is usually defined as the percentage quotient of the overall volume of solid inorganic constituents (pigment+fillers/extenders) divided by the overall volume of the solid inorganic constituents and of the polymer particles of the aqueous binder polymer dispersion; see Ullmanns Enzyklopädie der technischen Chemie, 4th edition, volume 15, p. 668.

In the case of exterior applications in particular, the coating compositions should be stable to environmental influences such as sunlight, moisture and fluctuations in temperature. In addition, the coating composition must adhere well to a variety of substrates even when exposed to moisture, which again depends on the chosen binder polymer.

Another property dependent on the binder polymer is the blocking resistance of the coatings.

WO 93/11181 discloses titanium dioxide-containing formulations comprising, as dispersing auxiliaries, aqueous addition-polymer dispersions whose polymers include itaconic acid copolymerized in an amount of more than 1% by weight based on the weight of the addition polymer. The wet abrasion resistance of the dispersions disclosed therein leaves much to be desired.

EP-A-810 274 discloses binders for solvent-free coating compositions which may comprise acid-functional monomers copolymerized in an amount of up to 1% by weight based on the overall weight of the monomers to be polymerized.

The prior art binders are able to go only some of the way toward meeting the requirements that are placed on coating compositions.

It is an object of the present invention to provide pigmented formulations having a high pigment binding capacity and, therefore, high wet abrasion resistance. These properties must be ensured even at relatively high pigment volume concentrations, i.e., at pvc >40%. The formulations should also be stable on storage—that is, their viscosity should show little or no increase even on prolonged storage.

We have found that this object is achieved by using for the formulations binders based on aqueous addition-polymer dispersions whose polymers comprise from 0.1 to 1.5% by weight of itaconic acid in copolymerized form.

The present invention accordingly provides pigment-comprising aqueous formulations comprising i) at least one copolymer P of ethylenically unsaturated monomers M in the form of an aqueous polymer dispersion which comprises from 0.1 to 1.5% by weight, based on the overall weight of the copolymer P, of itaconic acid as acidic monomer M1, its salts and/or its anhydride in copolymerized form, it being possible for up to 50% by weight of the itaconic acid to be replaced by another monomer having at least one acid group or one neutralized acid group, and has a glass transition temperature $T_G$ in the range from −10 to +50° C., ii) at least one inorganic pigment, iii) if desired, inorganic fillers/extenders, and iv) customary auxiliaries.

The monomers M of which the copolymer P is constructed preferably make up from 0.2 to 1.2% by weight, in particular from 0.2 to 1.0% by weight and, with particular preference, from 0.4 to 1.0% by weight. In an especially preferred embodiment the monomers M comprise from 0.5 to 0.9 and, specifically, from 0.5 to 0.8% by weight of itaconic acid as acidic monomer M1. Instead of itaconic acid it is also possible to employ its anhydride or its salts to prepare the copolymers P. A certain fraction of the itaconic acid, namely up to 50% by weight, but preferably not more than 25% by weight and in particular not more than 10% by weight, can be replaced by another monomer having at least one acid group; for example, by an ethylenically unsaturated carboxylic acid, such as acrylic acid or methacrylic acid, or by an ethylenically unsaturated sulfonic acid, an example being vinylsulfonic acid or its salts. Typical salts are the alkali metal and ammonium salts, preferably the sodium salts. Particular preference is given to employing itaconic acid as the sole acidic monomer (monomer M1).

Normally, the preparation of the copolymers P comprising itaconic acid takes place by free-radical addition polymerization of ethylenically unsaturated monomers M which in addition to itaconic acid include at least one further comonomer. Suitable comonomers are generally selected from vinylaromatic monomers, such as styrene, α-methylstyrene, o-chlorostyrene or vinyl-toluenes, the vinyl esters of aliphatic $C_1$–$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl pivalate, vinyl laurate, vinyl stearate, and commercial monomers VEOVA® 5–11 (VEOVA® X is a tradename of Shell and stands for vinyl esters of α-branched, aliphatic carboxylic acids having X carbon atoms, which are also referred to as versatic® X acids), and the esters of ethylenically unsaturated $C_3$–$C_8$ mono- or dicarboxylic acids with $C_1$–$C_{18}$-, preferably $C_1$–$C_{12}$-and, in particular, $C_1$–$C_8$-alkanols or $C_5$–$C_8$-cycloalkanols. Examples of suitable $C_1$–$C_{18}$-alkanols are methanol, ethanol, n-propanol, i-propanol, 1-butanol, 2-butanol, isobutanol, tert-butanol, n-hexanol, 2-ethylhexanol, lauryl alcohol and stearyl alcohol. Examples of suitable cyclolkanols are cyclopentanol and cyclohexanol. Particularly suitable esters are those of acrylic acid, methacrylic acid, crotonic acid, maleic acid, itaconic acid, citraconic acid or fumaric acid. The esters concerned are especially those of acrylic and/or methacrylic acid, such as methyl, ethyl, isopropyl, n-butyl, isobutyl, 1-hexyl, tert-butyl and 2-ethylhexyl (meth)acrylates, and also the esters of fumaric and maleic acid, examples being dimethyl fumarate, dimethyl maleate and di-n-butyl maleate. Also suitable are nitriles of α,β-monoethylenically unsaturated $C_3$–$C_8$ carboxylic acids, such as acrylonitrile or methacrylonitrile. It is also possible, furthermore, to employ $C_4$–$C_8$ conjugated dienes, such as 1,3-butadiene, isoprene or chloroprene α-olefins, such as ethylene, propene and isobutene, and vinyl chloride or vinylidene chloride as comonomers.

In addition to itaconic acid the monomers M preferably include from 50 to 99.9% by weight, based on the overall weight of the copolymer P, of at least one monomer M2 selected from the abovementioned vinylaromatic monomers, the abovementioned esters of ethylenically unsaturated $C_3$–$C_8$ monocarboxylic acids with $C_1$–$C_{12}$-alkanols, and the vinyl esters of aliphatic $C_1$–$C_{12}$ monocarboxylic acids. In a preferred embodiment of the present invention the monomers M2 are selected from the $C_1$–$C_{12}$-alkyl esters of acrylic acid and $C_1$–$C_{12}$-alkyl esters of methacrylic acid, especially methyl methacrylate, ethyl methacrylate, n-butyl methacrylate, tert-butyl methacrylate, ethyl acrylate, n-butyl acrylate, tert-butyl acrylate and 2-ethylhexyl acrylate. Based on the overall monomer amount, the monomers M2 make up preferably at least 80% by weight and in particular at least 90% by weight. The remainder of the abovementioned comonomers (referred to below as comonomers M') are generally used in amounts <50% by weight, preferably <20% by weight and, in particular, <10% by weight, based on the overall amount of the monomers M. A preferred embodiment of this invention relates to copolymers P which incorporate none of the abovementioned comonomers M'.

In a preferred embodiment of the invention the copolymers P comprise copolymerized monomers M3 which have urea groups, examples being N-vinyl- and N-allylurea and derivatives of imidazolidin-2-one, such as N-vinyl- and N-allylimidazolidin-2-one, N-vinyloxyethylimidazolidin-2-one, N-(2-(meth)acrylamidoethyl) imidazolidin-2-one, N-(2-(meth)acryloxyethyl)-imidazolidin-2-one, N-[2-((meth)acryloxyacetamido)ethyl)-imidazolidin-2-one etc. The monomers M3 are preferably used in amounts of from 0.1 to 10% by weight, in particular from 0.5 to 5% by weight, based on the overall weight of the copolymer P. The monomers M3 improve the wet adhesion of the coatings obtainable from the formulations of the invention, i.e., the adhesion of the coating in the wet or swollen state.

The copolymers P can also include in copolymerized form monomers comprising siloxane groups (monomers M4), examples being vinyltrialkoxysilanes, such as vinyltrimethoxysilane, alkylvinyl-dialkoxysilanes or (meth)acryloxyalkyltrialkoxysilanes, such as (meth)acryloxyethyltrimethoxysilane, or (meth)acryloxypropyl-trimethoxysilane. The monomers M4 can be used in amounts of up to 1% by weight, preferably from 0.05 to 0.5% by weight, based on the overall monomer amount.

In addition, the copolymer P may also include in copolymerized form neutral or nonionic monomers M5 whose homopolymers feature increased solubility in or swellability in water. These monomers are preferably copolymerized in amounts of <5% by weight and preferably <2% by weight, based on the overall weight of the copolymer P. Monomers of this kind enhance the stability of the polymer dispersions. Typical monomers M5 are the amides, the N-alkylolamides or the hydroxyalkyl esters of the abovementioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxyethyl methacrylate, hydroxypropyl acrylate and hydroxypropyl methacrylate.

In preparing the copolymers P it is also possible to employ bifunctional monomers M6. These are copolymerized if desired in minor amounts, generally from 0.1 to 5% by weight and, in particular, not more than 1% by weight, based on the overall monomer amount. Monomers M6 are preferably monomers having two nonconjugated ethylenically unsaturated bonds, examples being the diesters of dihydric alcohols with α,β-monoethylenically unsaturated $C_3$–$C_8$ carboxylic acids, such as glycol bisacrylate, or esters of α,β-unsaturated carboxylic acids with alkenols, such as bicyclodecenyl (meth)acrylate. Preferred polymers P contain no copolymerized monomers M6.

The character of the formulations of the invention is also dependent on the glass transition temperature (DSC, midpoint temperature, ASTM D 3418-82) of the copolymer P. If the glass transition temperature is too low, the coating is not very strong and tears when subjected to a mechanical load. If it is too high, the polymer no longer forms a film and the coating, consequently, is of reduced wet abrasion resistance. The glass transition temperature of the copolymers P in question is therefore below 50° C. and preferably below 40° C., in particular below 30° C. In general, however, it is above −10° C. It proves useful in this context to estimate the glass transition temperature. $T_g$ of the dispersed polymer. According to Fox (T. G. Fox, Bull. Am. Phys. Soc. (Ser. II) 1, [1956]123 and Ullmanns Enzyklopädie der technischen Chemie, Weinheim (1980), p. 17, 18) the glass transition temperature of copolymers at high molar masses is given in good approximation by $$\frac{1}{T_g} = \frac{X^1}{T_g^1} + \frac{X^2}{T_g^2} + \ldots \frac{X^n}{T_g^n}$$

where $X^1$, $X^2$ ..., $X^n$ are the mass fractions of the monomers 1, 2, ..., n and $T_g^1$, $T_g^2$, ..., $T_g^n$ the glass transition temperatures of the homopolymers of 1, 2, ..., n, in kelvins. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

From what has been said above it is clear that the glass transition temperature of the copolymer P can be adjusted both by choosing an appropriate principal monomer M2, having a glass transition temperature within the desired range, and by combining at least one monomer M2a having a high glass transition temperature with at least one monomer M2b having a low glass transition temperature, the latter procedure being preferred.

In a preferred embodiment of the present invention the monomers M making up the copolymer P include at least one monomer M2a whose homopolymer, for the limiting case of a very high (infinite) molecular mass, has a glass transition temperature $T_g$>30° C. and at least one monomer M2b, whose homopolymer has a glass transition temperature $T_g$<20° C. Examples of monomers M2a suitable for this purpose are styrene, α-methylstyrene, methyl methacrylate, ethyl methacrylate, n- and iso-propyl methacrylate, n-, iso- and tert-butyl methacrylate, tert-butyl acrylate and vinyl acetate, and also acrylonitrile and methacrylonitrile, the two nitriles preferably accounting for not more than 30% by weight of the monomers M2a. Examples of monomers M2b suitable for this purpose are the $C_1$–$C_{12}$-alkyl acrylates, butadiene, vinyl versatates, and especially ethyl acrylate, n-butyl acrylate and 2-ethylhexyl acrylate. Particular preference is given to monomer combinations M2a/M2b which comprise styrene and/or methyl methacrylate and also n-butyl acrylate with or without 2-ethylhexyl acrylate.

In one particularly preferred embodiment of the present invention the copolymer P is constructed from:
  i) from 20 to 80% by weight, preferably from 35 to 70% by weight, of monomers M2a, especially styrene and/or methyl methacrylate, specifically methyl methacrylate as sole monomer M2a,
  ii) from 20 to 79.7% by weight, preferably from 30 to 65% by weight, of monomers M2b, especially n-butyl acrylate and/or ethylhexyl acrylate,
  iii) from 0.1 to 1.5% by weight, preferably from 0.2 to 1.2% by weight, especially from 0.3 to 1.0% by weight and, with particular preference, from 0.5 to 0.8% by weight of itaconic acid,
  iv) from 0.2 to 5% by weight, preferably from 0.5 to 3% by weight of monomers M3 having at least one urea group, especially an ethylenically unsaturated derivative of imidazolidin-2-one,
where the proportions by weight of the monomers M1, M2a, M2b and M3 add up to 100% by weight. Such copolymers P are frequently employed in formulations of the invention comprising solvents.

In another preferred embodiment of the present invention the copolymer P is constructed from:
  i) from 20 to 69.7% by weight, preferably from 30 to 60% by weight, of monomers M2a, especially styrene and/or methyl methacrylate, specifically styrene as sole monomer M2a,
  ii) from 30 to 80% by weight, preferably from 40 to 70% by weight, of monomers M2b, especially n-butyl acrylate and/or ethylhexyl acrylate,
  iii) from 0.2 to 1% by weight, preferably from 0.4 to 0.9% by weight, especially from 0.5 to 0.8% by weight of itaconic acid,
  iv) from 0.1 to 3% by weight, in particular from 0.2 to 2% by weight, of monomers M5, especially acrylamide and/or methacrylamide,
where the proportions by weight of the monomers M1, M2a, M2b and M5b add up to 100% by weight. Such copolymers P are frequently employed in formulations of the invention that are solvent-free.

The copolymers P of the two preferred embodiments can of course be modified with siloxane groups, by means, for example, of copolymerized monomers M4 (see above) or by using regulators containing siloxane groups, examples being mercaptoalkyltri-alkoxysilanes such as mercaptopropyltri-methoxysilane.

It has additionally proven advantageous if the polymer particles in the binder polymer dispersion have a ponderal median polymer particle diameter in the range from 50 to 1000 nm (determined by means of an ultracentrifuge or by photon correlation spectro-scopy; regarding the determination of particle size by means of an ultra-centrifuge see, for example, W. Machtle, Makromolekulare Chemie 185, (1984) 1025–1039 and W. Machtle, Angew. Makromolekulare Chemie 162 (1988) 35–42). In the case of binder dispersions with high solids contents, such as >50% by weight, based on the overall weight of the binder dispersion, it is advantageous on grounds of viscosity for the ponderal median diameter of the polymer particles in the dispersion to be $\geq 250$ nm. The median particle diameter will generally not exceed 1000 nm and preferably will not exceed 600 nm.

The aqueous polymer dispersions employed in accordance with the invention are preferably prepared by free-radical aqueous emulsion polymerization of the abovementioned monomers in the presence of at least one free-radical polymerization initiator and, if desired, of a surface-active substance.

Suitable free-radical polymerization initiators are all those capable of triggering a free-radical aqueous emulsion polymerization reaction. They can be peroxides, for example, alkali metal peroxodisulfates, or azo compounds. As polymerization initiators it is common to use redox initiators, which are composed of at least one organic reducing agent and at least one peroxide and/or hydroperoxide, examples being tert-butyl hydroperoxide with sulfur compounds, such as the sodium salt of hydroxymethanesulfinic acid, sodium sulfite, sodium disulfite, sodium thiosulfate or acetone bisulfite adduct, or hydrogen peroxide with ascorbic acid. Use is also made of combined systems which comprise a small amount of a metal compound which is soluble in the polymerization medium and whose metal component can exist in a plurality of valence states, an example of such a system being ascorbic acid/iron(II) sulfate/hydrogen peroxide, where the ascorbic acid is frequently replaced by the sodium salt of hydroxymethanesulfinic acid, acetone bisulfite adduct, sodium sulfite, sodium hydrogen sulfite or sodium bisulfite, and the hydrogen peroxide by organic peroxides, such as tert-butyl hydroperoxide, or alkali metal peroxodisulfates and/or ammonium peroxodisulfate. Initiators which are likewise preferred are peroxodisulfates, such as sodium peroxodisulfate. The amount of the free-radical initiator system that is employed, based on the overall amount of monomers to be polymerized, is preferably from 0.1 to 2% by weight.

Surface-active substances suitable for conducting the emulsion polymerization are the emulsifiers and protective colloids commonly employed for this purpose. The surface-active substances are normally employed in amounts of up to 10% by weight, preferably from 0.5 to 5% by weight and, in particular, from 1 to 4% by weight, based on the monomers to be polymerized.

Examples of suitable protective colloids are polyvinyl alcohols, starch derivatives and cellulose derivatives, or vinylpyrrolidone copolymers. An exhaustive description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, pp. 411–420.

As surface-active substances it is preferred to employ exclusively emulsifiers, whose relative molecular weights, unlike those of the protective colloids, are usually below 2000. They can be anionic or nonionic in nature. The anionic emulsifiers include alkali metal salts and ammonium salts of alkyl sulfates (alkyl: $C_8$–$C_{12}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$), and also compounds of the general formula I,

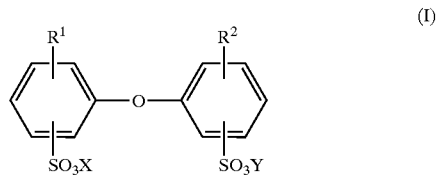

(I)

where $R^1$ and $R^2$ are hydrogen or $C_4$–$C_{24}$-alkyl, preferably $C_8$–$C_{16}$-alkyl, but are not both hydrogen and X and Y can be alkali metal ions and/or ammonium ions. Use is frequently made of technical-grade mixtures which have a proportion of from 50 to 90% by weight of the monoalkylated product, an example being Dowfax® 2A1 ($R^1$=$C_{12}$-alkyl; DOW CHEMICAL). The compounds I are widely known, from U.S. Pat. No. 4,269,749, for example, and are obtainable commercially.

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: 3 to 50) and, of these, particular preference to those based on naturally occurring alcohols or on oxo alcohols having a linear or branched $C_{12}$–$C_{18}$-alkyl radical and a degree of ethoxylation of from 8 to 50. Preference is given to anionic emulsifiers or to combinations of at least one anionic and one nonionic emulsifier.

Further suitable emulsifiers are given in Houben-Weyl, op. cit. pp. 192–208.

The molecular weight of the copolymers P can be adjusted by adding small amounts, generally up to 2% by weight based on the monomers to be polymerized, of one or more molecular weight regulators, examples being organic thiocompounds, silanes, allyl alcohols, and aldehydes.

The emulsion polymerization can be conducted either continuously or by the batch procedure, preferably by a semicontinuous process. In semicontinuous processes the major amount—that is, at least 70%, preferably at least 90% of the monomers to be polymerized—is supplied continuously, including by a staged or gradient procedure, to the polymerization batch. This procedure is also referred to as the monomer feed process. It has been found advantageous in this context for the major amount of the itaconic acid—that is, at least 50%, preferably at least 80%, in particular at least 90% and, with very particular preference, all of the itaconic acid to be supplied to the polymerization reaction by way of the monomer feed; in other words, no more than 50% of the itaconic acid and, with very particular preference, no itaconic acid is included in the initial charge to the polymerization vessel before the polymerization is begun. By monomer feeds are meant liquid monomer mixtures, monomer solutions or, in particular, aqueous monomer emulsions.

In addition to the seed-free preparation method it is also possible, in order to establish a defined polymer particle size, to conduct the emulsion polymerization by the seed latex process or in the presence of a seed latex prepared in situ. Processes for this purpose are known and can be found in the prior art (see EP-B 40419, EP-A-614 922, EP-A-567 812 and literature cited therein and also Encyclopedia of Polymer Science and Technology', Vol. 5, John Wiley & Sons Inc., New York 1966, p. 847).

The polymerization is preferably conducted in the presence of from 0.01 to 3% by weight and, in particular, from 0.02 to 1.5% by weight of a seed latex (solids content of the seed latex, based on overall monomer amount), preferably with a seed latex included in the initial charge (initial charge seed).

The preparation of the aqueous dispersions of the copolymers P can also be carried out by what is known as staged polymerization. This means a procedure in a 1st stage of which the monomers of the 1st stage are polymerized by free-radical aqueous emulsion polymerization, preferably in the presence of a seed latex, after which the monomers of the 2nd stage are polymerized in the aqueous dispersion of the resultant 1st-stage polymer. This may be followed by further polymerization stages. In such a procedure, the monomer mixtures of the 1st stage and of the 2nd stage differ in the nature of the monomers and/or in the relative proportions of the monomers. The nature of the monomers to be polymerized in the 1st and 2nd stages is preferably the same. Where the monomers M include both a monomer M2a and a monomer M2b, the monomer mixtures of the 1st stage differ from those of the 2nd stage by the proportion M2a/M2b. In particular, the proportion M2a/M2b in the 1st stage is greater than the proportion M2a/M2b in the 2nd stage. The proportion of the monomers of the 1st stage to the monomers of the 2nd stage lies preferably within the range from 1:10 to 10:1 and, in particular, in the range from 1:5 to 5:1. Staged polymerization achieves the polymerization of the monomers of the 2nd stage (and, where appropriate, of subsequent stages) onto the polymer particles of the 1st stage.

The pressure and temperature of polymerization are of minor importance. It is normal to operate at temperatures of between room temperature and 120° C., preferably at temperatures from 40 to 95° C. and, with particular preference, between 50 and 90° C.

Following the polymerization reaction proper, it may be necessary to render the aqueous polymer dispersions of the invention substantially free from odoriferous substances, such as residual monomers and other volatile organic constituents. This can be done physically in a manner known per se, by distillative removal (especially by steam distillation), or by stripping with an inert gas. The residual monomer content can also be lowered chemically by means of free-radical postpolymerization, especially under the action of redox initiator systems, as are set out, for example, in DE-A 44 35 423. Postpolymerization is preferably conducted with a redox initiator system comprising at least one organic peroxide and one organic sulfite.

The dispersions of the copolymer P are preferably adjusted to a pH in the range from 6 to 10 before being used in the formulations of the invention, preferably by adding a nonvolatile base, examples being alkali metal hydroxides, alkaline earth metal hydroxides or nonvolatile amines.

By the method of emulsion polymerization it is possible in principle to obtain dispersions having solids contents of up to about 80% by weight (polymer content based on the overall weight of the dispersion). For practical reasons it is generally preferred to use polymer dispersions having solids contents in the range from 40 to 70% by weight for the formulations of the invention. Particular preference is given to dispersions having polymer contents of about 50% by weight. Dispersions having lower solids contents are of course suitable in principle for use for the formulations of the invention.

In accordance with the invention the copolymers P comprising itaconic acid are employed in the form of their aqueous polymer dispersions as binders in pigmented formulations that are used to coat substrates. Examples of what are meant by such formulations include polymer dispersion plasters, tile adhesives, paints and varnishes, and sealants or sealing compounds, especially for porous components.

A preferred embodiment of the present invention relates to formulations in the form of emulsion paints.

The formulations of the invention, preferably emulsion paints, generally contain from 30 to 75% by weight and, preferably, from 40 to 65% by weight, of nonvolatile constituents. By these are meant all those constituents of the formulation except for water, but at least the total amount of binder, extender, pigment, solvents of low volatility (boiling point above 220° C.), such as plasticizers, and polymeric auxiliaries. Of these, the amounts accounted for by each class of constituent are from 3 to 90% by weight, preferably from 10 to 60% by weight, by solid binder constituents (=copolymer P), ii from 5 to 85% by weight, preferably from 10 to 60% by weight, by at least one inorganic pigment, iii from 0 to 85% by weight, preferably from 20 to 70% by weight, by inorganic fillers, and iv from 0.1 to 40% by weight, preferably from 0.5 to 15% by weight, by customary auxiliaries.

The pvc of the formulations is generally above 10%, for example from 15 to 85%. In one preferred embodiment of the invention it is within the range from 15 to 25%. In another preferred embodiment of the invention the pvc is in the range from >40% to 60% by weight, e.g., at about 45% by weight. In a further preferred embodiment of the invention the pvc is >60%, preferably >70%, and can be up to 85%.

Typical pigments for the formulations of the invention, especially for emulsion paints, are, for example, titanium dioxide, preferably in the rutile form, barium sulfate, zinc oxide, zinc sulfide, basic lead carbonate, antimony trioxide, and lithopones (zinc sulfide+barium sulfate). However, the formulations may also comprise color pigments, examples being iron oxides, carbon black, graphite, luminescent pigments, zinc yellow, zinc green, ultramarine, manganese black, antimony black, manganese violet, Paris blue or Schweinfurt green. In addition to the inorganic pigments the formulations of the invention may also include organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal complex pigments.

Suitable fillers include, in principle, alumosilicates, such as feldspars, silicates, such as kaolin, talc, mica, magnesite, alkaline earth metal carbonates, such as calcium carbonate, in the form, for example, of calcite or chalk, magnesium carbonate, dolomite, alkaline earth metal sulfates, such as calcium sulfate, silicon dioxide, etc. The fillers can be employed as individual components. In practice, however, filler mixtures have proven especially suitable, such as calcium carbonate/kaolin and calcium carbonate/talc. Dispersion plasters may also include relatively coarse aggregates, such as sands or sandstone granules. In emulsion paints, of course, finely divided fillers are preferred.

To increase the hiding power and to save on the use of white pigments it is common in the preferred emulsion paints to employ finely divided fillers (extenders), examples being finely divided calcium carbonate or mixtures of different calcium carbonates having different particle sizes. To adjust the hiding power, the shade and the depth of color it is preferred to employ blends of color pigments and extenders.

The customary auxiliaries iv include wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and salts of naphthalenesulfonic acids, especially their sodium salts. The dispersants are generally employed in an amount of from 0.1 to 0.6% by weight based on the overall weight of the emulsion paint.

The auxiliaries iv may also include thickeners, examples being cellulose derivatives, such as methylcellulose, hydroxyethyl-cellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers, and what are known as associative thickeners, examples being styrene-maleic anhydride polymers or, preferably, hydrophobically modified polyetherurethanes, as are described, for example, by N. Chen et al. in J. Coatings Techn. Vol 69, No. 867, 1997, p. 73 and by R. D. Hester et al. in J. Coatings Technology, Vol. 69, No. 864, 1997, 109, the content of which is hereby incorporated in its entirety by reference.

Examples of hydrophobically modified polyetherurethanes are polymers of the general formula II

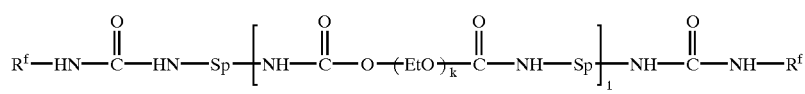

(II)

where $R^f$ is a hydrophobic radical, preferably a linear or branched alkyl of 10 to 20 carbon atoms, Et is 1,2-ethylene, Sp is $C_2$–$C_{10}$-alkylene, cycloalkylene or arylene, k is from 50 to 1000 and l is from 1 to 10, the product k×l preferably being from 300 to 1000. The dispersants and/or wetting agents are employed in general in an amount of from 0.1 to 0.6% by weight, based on the overall weight of the emulsion paint.

Inorganic thickeners, such as bentonites or hectorite, can also be used. Thickeners are generally used in amounts of from 0.1 to 3% by weight, preferably from 0.1 to 1% by weight, based on the overall weight of the aqueous formulation. In addition, the auxiliaries iv generally also include defoamers, preservatives or hydrophobicizing agents, biocides, fibers or other constituents.

In addition, in order to adjust the film-forming properties of the binder polymers, the coating compositions may also comprise what are known as film-forming consolidating agents (plasticizers), examples being ethylene glycol, propylene glycol, butylene glycol, hexylene glycol, alkyl ethers and alkyl ether esters of glycols and polyglycols, e.g., diethylene glycol monoethyl ether, diethylene glycol monoethyl ether acetate, diethylene glycol monobutyl ether, hexylene glycol diacetate, propylene glycol monoethyl ether, monophenyl ether, monobutyl ether and monopropyl ether, dipropylene glycol monomethyl ether, and mono-n-butyl ether, tripropylene glycol mono-n-butyl ether, and the acetates of said monoalkyl ethers, such as butoxybutyl acetate, and also alkyl esters of aliphatic mono- and dicarboxylic acids, such as Texanol® from Eastman, or technical-grade mixtures of dibutyl esters of succinic, glutaric and adipic acid. Film-forming auxiliaries are customarily employed in amounts of from 0.1 to 20% by weight, based on the copolymer P present in the formulation, so that the formulation has a minimum film-forming temperature of <15° C. and preferably in the range from 0 to 10° C.

A distinction is often made between solventborne and solventless paints. Solventborne paints are preferably employed for exterior applications and solventless paints preferably for interior applications. Typical solventborne paints include not only the abovementioned film-forming auxiliaries but also, for the same purpose, hydrocarbons and/or mixtures thereof, with or without aromatic constituents, such as white spirits in the boiling range from 140 to 210° C. The copolymers P in solventborne formulations often have a glass transition temperature $T_G \geq 5°$ C. and, preferably, $\leq 30°$ C. In solventless paints the glass transition temperature is preferably $\leq 10°$ C.

Furthermore, the formulations employed in accordance with the invention may also include crosslinking additives. Additives of this kind can be aromatic ketones, such as alkyl phenyl ketones unsubstituted or with one or more substituents on the phenyl ring, or benzophenone and substituted benzophenones, as photoinitiators. Photoinitiators suitable for this purpose are known, for example, from DE-A-38 27 975 and EP-A-417 568. Other suitable crosslinking compounds are water-soluble compounds having at least two amino groups, examples being dihydrazides of aliphatic dicarboxylic acids in accordance with DE-A-39 01 073, if the copolymer P comprises carbonyl-containing monomers in copolymerized form.

The formulations of the invention are stable fluid systems which can be used to coat a large number of substrates. Accordingly, the present invention also provides a method of coating substrates. Examples of suitable substrates are wood, concrete, metal, glass, ceramics, plastic, plaster, wallpaper and coated, primed or weathered substrates. The formulation is applied to the target substrate in a manner dependent on the form of the formulation. Depending on the viscosity and pigment content of the formulation and on the substrate, application may take place by means of rolling, brushing, knife coating or spraying.

The coatings produced using the formulations of the invention are notable for high wet abrasion resistance and good adhesion under damp conditions, i.e., in the wet or swollen state. An improved wet abrasion resistance—in other words, an improved mechanical stability of the coatings toward abrasive influences in the damp state—is favorable for the weathering stability and wet cleaning stability of the coatings and therefore means that they can be washed. Moreover, the coatings are not tacky, and feature high blocking resistance.

The advantageous properties of the copolymer P as binder relative to prior art binder polymers, and especially its improved wet abrasion resistance, is equally in evidence in the case of pigmented formulations having a pvc of <40% and in the case of formulations having a pvc of >40% or a pvc of >60%. The advantages of the invention become particularly evident if the formulations have a pvc of >40% and up to 85%, for example, a pvc of about 45% or a pvc of from 70 to 80%. Accordingly, the present invention also provides for the use of the copolymers P to improve the wet abrasion resistance of pigment-comprising formulations.

The examples below are intended to illustrate the invention without restricting it.

I. Preparing and Characterizing the Polymer Dispersions (Copolymers P)

The average particle size (z-average) of the polymer particles was found by dynamic light scattering (photon correlation spectroscopy) on a 0.01% by weight dispersion in water at 23° C. using an Autosizer IIc from Malvern Instruments, England. The value stated is the cumulant z-average of the measured autocorrelation function.

The minimum film-forming temperature (MFT) of the polymer dispersions was determined in accordance with Ullmanns Enzyklopädie der technischen Chemie, 4th ed., Vol. 19, VCH Weinheim 1980, p. 17. The measuring device used was a film formation bench (a metal plate to which a temperature gradient is applied and on which temperature sensors are mounted at different points for the purpose of temperature calibration, the temperature gradient being chosen such that one end of the film formation bench has a temperature above the anticipated MFT and the other end has a temperature below the anticipated MFT). The aqueous polymer dispersion is then applied to the film formation bench. In those regions of the film formation bench whose temperature is above the MFT the dispersion dries to form a clear film whereas in the cooler regions cracks appear in the film and at lower temperatures still it forms a white powder. The MFT is determined visually on the basis of the known temperature profile of the plate.

1. Comparative Dispersion CD1

A reactor was charged with 234 g of deionized water, 38 g of aqueous sodium pyrophosphate solution (5% strength by weight) and 4.61 g of a polystyrene seed latex (particle size about 30 nm, solids content about 33% by weight). This initial charge was heated to 85° C. under nitrogen. Then 7.24 g of aqueous initiator solution were added. A monomer emulsion was then added over the course of 3 hours, and the remainder of the initiator solution over the course of 4 hours. After the end of the addition of initiator the temperature was maintained for 1 hour and then lowered to 60° C. Subsequently, 6.36 g of a 15% strength by weight aqueous solution of tert-butyl hydroperoxide and 7.25 g of an aqueous 13.1% strength by weight solution of acetone bisulfite were supplied to the reactor by way of separate feeds. The 60° C. were maintained for 1 hour. The batch was then cooled to room temperature and its pH adjusted to 7.4 using 10% strength by weight sodium hydroxide solution. The resulting dispersion was free from coagulum and had a solids content of 60.1% by weight. The ponderal median particle diameter of the polymer was 270 nm. Its MFT was 6° C.

Initiator solution: 2.38 g of sodium peroxodisulfate
    70.00 g of deionized water
Monomer emulsion: 227.73 g of deionized water
    21.11 g of emulsifier solution 1
  47.50 g of emulsifier solution 2
  356.25 g of methyl methacrylate
    502.55 g of n-butyl acrylate
    19.00 g of methacrylic acid
    72.20 g of a 25% strength by weight solution of N-(methacryloxyethyl) imidazolidin-2-one in methyl methacrylate
Emulsifier solution 1: 45% strength by weight solution of sodium (dodecylsulfonylphenoxy) benzenesulfonate (Dowfax® 2A1 from Dow Chemicals) in water
Emulsifier solution 2: 30% strength by weight solution of the sodium salt of a sulfuric monoester mixture of $C_{10}$–$C_{16}$-alkyl ethoxylates (average EO units 30) in water (Disponil® FES 77 from Henkel KGaA).

2. Comparative Dispersion CD2

In the manner described for CD1 but with a different monomer composition a comparative dispersion CD2 was prepared. Instead of the polystyrene seed latex the initial charge contained 19 g of acrylate latex (50% strength by weight, $d_{50}$=130 nm). Following the polymerization reaction, the pH was adjusted to 7.0 using 10% strength by weight sodium hydroxide solution. The resulting dispersion was free from coagulum and had a solids content of 58.7% by weight. The average diameter of the polymer particles was 235 nm. The MFT was 4° C.

Monomer emulsion: 226.41 g of water
  21.11 g of emulsifier solution 1
  47.50 g of emulsifier solution 2
  356.25 g of methyl methacrylate
  502.55 g of n-butyl acrylate
  19.00 g of itaconic acid
  72.20g of a 25% strength by weight solution of N-(methacryloxyethyl) imidazolidin-2-one in methyl methacrylate.

3. Comparative Dispersion CD3

A reactor was charged with 175 g of deionized water, 38 g of aqueous sodium pyrophosphate solution (5% strength by weight) and 3.80 g of a polystyrene seed latex (particle size about 30 nm, solids content about 5% by weight). This initial charge was heated to 85° C. under nitrogen. Then 7.24 g of aqueous initiator solution were added. A monomer emulsion was then added over the course of 3 hours, and the remainder of the initiator solution over the course of 4 hours. After the end of the addition of initiator the temperature was maintained for 1 hour and then lowered to 60° C. Subsequently, 1.36 g of a 15% strength by weight aqueous solution of tert-butyl hydroperoxide and 7.25 g of an aqueous 13.1% strength by weight solution of acetone bisulfite were supplied to the reactor by way of separate feeds. The 60° C. were maintained for 1 hour. The batch had its pH adjusted to 8.5 using 10% strength by weight sodium hydroxide solution. The resulting dispersion was free from coagulum and had a solids content of 52.8% by weight. The ponderal median particle diameter was 280 nm. Its MFT was 2° C.

Initiator solution: 2.38 g of sodium peroxodisulfate
  70.00 g of deionized water Monomer emulsion: 379.15 g of deionized water
  63.33 g of emulsifier solution 3
  118.75 g of emulsifier solution 4
  391.88 g of methyl methacrylate
  513.00 g of n-butyl acrylate
  19.00 g of itaconic acid
  38.00 g of a 25% strength by weight solution of N-(methacryloxyethyl) imidazolidin-2-one in methyl methacrylate.

Emulsifier solution 3: 15% strength by weight solution of sodium dodecylbenzenesulfonate in water Emulsifier solution 4: 20% strength by weight solution of an ethoxylated $C_{16}$–$C_{18}$ fatty alcohol (18 EO units)

4. Comparative Dispersion CD4

A polymerization reactor was charged with 235 g of deionized water and 3.8 g of polystyrene seed latex (5% strength by weight, $d_{50}$=30 nm) and this initial charge was flushed with nitrogen and heated to 85° C. Then 7.24 g of aqueous initiator solution were added. Subsequently, still at 85° C., the monomer emulsion I was added over the course of 3 h and the initiator solution over the course of 4 h. After the end of the addition of the monomer emulsion I the monomer emulsion II was introduced into the reactor over the course of 1 h. After the end of the addition of initiator and monomer the 85° C. were maintained for a further hour and the batch was then cooled to 60° C. Then, at 60° C., 1.36 g of a 15% strength by weight aqueous solution of tert-butyl hydroperoxide and 7.25 g of a 13.1% strength by weight aqueous solution of acetone bisulfite were introduced into the reactor by way of separate feeds and the 60° C. were maintained for 1 hour. The batch was then cooled to room temperature and its pH was adjusted to 8.5 using 10% strength by weight sodium hydroxide solution. The dispersion was free from coagulum and had a solids content of 63.9% by weight. The average polymer particle diameter was 270 nm and the minimum film-forming temperature of the dispersion was 13° C.

Initiator solution: 2.38 g of sodium peroxodisulfate
  70.00 g of deionized water Monomer emulsion I: 47.84 g of deionized water
  66.50 g of emulsifier solution 3 (see CD3)
  66.50 g of emulsifier solution 4 (see CD3)
  14.25 g of 10% strength by weight sodium hydroxide solution
  332.03 g of methyl methacrylate
  312.55 g of n-butyl acrylate
  4.75 g of acrylic acid
  9.75 g of a 25% strength by weight solution of N-(methacryloxyethyl)-imidazolidin-2-one in methyl methacrylate Monomer emulsion II: 16.98 g of deionized water
  28.50 g of emulsifier solution 3
  28.50 g of emulsifier solution 4
  108.20 g of methyl methacrylate
  140.41 g of n-butyl acrylate
  2.38 g of acrylic acid
  28.50 g of a 25% strength by weight solution of N-(methacryloxyethyl) imidazolidin-2-one in methyl methacrylate 5. Comparative Dispersion CD5

CD5 was prepared in analogy to CD4 but replacing the acrylic acid by equal amounts of methacrylic acid. Following the polymerization, the pH was adjusted to 8.6. The dispersion was free from coagulum and had a solids content of 62.8% by weight. The ponderal median polymer particle diameter was 272 nm and the minimum film-forming temperature was 10° C.

6. Dispersion D1 (Inventive)

The inventive dispersion D1 was prepared in analogy to the comparative dispersion CD3. The monomer emulsion had the following composition:

117.74 g of deionized water
63.33 g of emulsifier solution 3
118.75 g of emulsifier solution 4
391.88 g of methyl methacrylate
513.00 g of n-butyl acrylate
9.50 g of itaconic acid
38.00 g of a 25% strength by weight solution of N-(methacryloxyethyl)imidazolidin-2-one in methyl methacrylate Following its preparation, the pH of the dispersion was adjusted to 8.7 using 10% strength by weight sodium hydroxide solution. The resulting dispersion was free from coagulum and had a solids content of 62.8% by weight. The ponderal median polymer particle diameter was 311 nm, the MFT 4.0° C.

7. Dispersion D2

The inventive dispersion D2 was prepared in analogy to the comparative dispersion CD2.

The monomer emulsion had the following composition:

230.96 g of deionized water
21.11 g of emulsifier solution 1 (see CD1)
47.50 g of emulsifier solution 2 (see CD1)
356.25 g of methyl methacrylate
502.55 g of n-butyl acrylate 9.50 g of itaconic acid 72.20 g of 25% strength by weight solution of N-(methacryloxyethyl) imidazolidin-2-one in methyl methacrylate Following the polymerization the dispersion was neutralized to a pH of 7.0 with 10% strength by weight sodium hydroxide solution. The resulting dispersion was virtually free from coagulum and had a solids content of 58.7% by weight. The average polymer particle diameter was 235 nm, the MFT was 4.0° C.

8. Dispersion D3

The inventive dispersion D3 was prepared in analogy to the comparative dispersion CD3. The monomer emulsion had the following composition:

92.62 g of deionized water 63.33 g of emulsifier solution 3 (see CD3)

118.75 g of emulsifier solution 4 (see CD3)

391.88 g of methyl methacrylate 513.00 g of n-butyl acrylate 7.13 g of itaconic acid 38.00 g of a 25% strength by weight solution of N-(methacryloxyethyl)imidazolidin-2-one in methyl methacrylate The dispersion was neutralized to a pH of 9.5 with 10% strength by weight sodium hydroxide solution. The resulting dispersion was free from coagulum and had a solids content of 64.9% by weight. The average polymer particle diameter was 285 nm, the MFT was 2.0° C.

9. Dispersion D4

The inventive dispersion D4 was prepared in analogy to the comparative dispersion CD4.

Monomer emulsion I: 47.84 g of deionized water 66.50 g of emulsifier solution 3 (see CD3)

66.50 g of emulsifier solution 4 (see CD3)

14.25 g of 10% strength by weight sodium hydroxide solution 332.03 g of methyl methacrylate 312.55 g of n-butyl acrylate 4.75 g of itaconic acid 9.50 g of a 25% strength by weight solution of N-(methacryloxyethyl) imidazolidin-2-one in methyl methacrylate Monomer emulsion II: 16.98 g of deionized water 28.50 g of emulsifier solution 3

28.50 g of emulsifier solution 4

108.02 g of methyl methacrylate 140.41 g of n-butyl acrylate 2.38 g of itaconic acid 28.50 g of a 25% strength by weight solution of N-(methacryloxyethyl) imidazolidin-2-one in methyl methacrylate.

10. Dispersion D5

The inventive dispersion D5 was prepared in analogy to the dispersion D4 except that all of the itaconic acid in the monomer emulsion II was replaced by acrylic acid. The MFT of the dispersion was 10° C.

11. Comparative Dispersions CD6, CD7 and Dispersion D6

A polymerization reactor was charged with 200 g of deionized water, 0.1 g of formic acid, 7.5 g of emulsifier solution 4 (see CD3), 1.5 g of stearyl alcohol and 40 g of monomer emulsion and this initial charge was heated to 85° C. under nitrogen. Then, at 85° C., 10 g of initiator solution were introduced into the polymerization reactor. 15 minutes after the addition of initiator the remainder of the monomer emulsion was added over the course of 120 minutes and the remainder of the initiator solution over the course of 135 minutes, these additions to the polymerization reactor beginning simultaneously but taking place by way of separate feeds and still at 85° C. After the end of the addition of initiator the 85° C. were maintained for a further 2 h, the batch was cooled to 70° C., and then 0.71 g of a 70% strength by weight aqueous solution of tert-butyl hydroperoxide was introduced into the polymerization reactor. This was followed by the metered addition over 30 minutes at 70° C. of 5 g of a 10% strength by weight aqueous solution of hydroxymethanesulfinic acid, as the sodium salt. The dispersion was subsequently cooled to room temperature, 12 g of 10% strength by weight sodium hydroxide solution were added, and the dispersion was filtered through a sieve having a mesh size of 250 μm.

Initiator solution: 1.50 g of sodium peroxodisulfate 100.00 g of deionized water Monomer emulsion: 120.00 g of deionized water 20.00 g of emulsifier solution 1 (see CD1)

80.00 g of emulsifier solution 4 (see CD3)

26.70 g of 15% strength by weight aqueous sodium lauryl sulfate solution 5.00 g of polymerizable acid (Table 1)

1.00 g of mercaptopropyltrimethoxysilane 15.00 9 of 50% strength by weight aqueous acrylamide solution 200.00 g of styrene 300.00 g of n-butyl acrylate

TABLE 1

| Dispersion | polymerizable acid | SC [% by wt.] | LT [%] |
| --- | --- | --- | --- |
| CD6 | Acrylic acid | 48.9 | 68 |
| CD7 | Methacrylic acid | 49.2 | 72 |
| D6 | Itaconic acid | 49.7 | 73 |

SC = Solids content of the dispersion
LT = Light transmittance of a sample diluted to 0.01% by weight, path length 2.5 cm, relative to water 12. Dispersions CD8, CD9 and D7

The dispersions CD8, CD9 and D7 were prepared in analogy to dispersions CD6, CD7 and D6. The following components were included in the initial charge:

200.00 g of deionized water 12.50 g of emulsifier solution 4 (see CD3)

5.00 g of emulsifier solution 1, 20% strength by weight (see CD1)

37.00 g of monomer emulsion

The monomer emulsion had the following composition:

170.00 g of deionized water 35.00 g of emulsifier solution 1, 20% strength by weight (see CD1)

25.00 g of emulsifier solution 4 (see CD3)

x g polymerizable acid (see Table 2)

y g of 50% strength by weight aqueous acrylamide solution 250.00 g of styrene 250.00 g of n-butyl acrylate Following the polymerization the dispersion was neutralized to a pH of 7.5 with 10% strength sodium hydrox-

TABLE 2

| Dispersion | polymerizable acid [g] | Acrylamide solution [g] | SC [%] | LT [%] |
|---|---|---|---|---|
| CD8 | Methacrylic acid; 13.5 | 15.0 | 49.1 | 65 |
| CD9 | Acrylic acid 13.5 | 15.0 | 49.9 | 68 |
| D7 | Itaconic acid 5.0 | 0 | 49.2 | 71 |

SC = Solids content of the dispersion
LT = Light transmittance of a sample diluted to 0.01% by weight, path length 2.5 cm, relative to water II. Preparing the Formulations of the Invention 1. Emulsion paints with a pvc of 46.9%; formulation (I) (comparative examples C1 to C5, Inventive Examples 1 to 5)

A vessel was charged with the following constituents:

105.60 g of water
2.00 g of thickener[1]
0.80 g of 2-amino-2-methylpropanol with 5% water
1.00 g of dispersant[2]
3.40 g of 10% strength by weight aqueous tetrapotassium pyrophosphate solution
1.70 g of commercial biocide[3]
3.40 g of commercial defoamer[4]
10.10 g of propylene glycol and
10.10 g of dipropylene glycol n-butyl ether.

1) Hydroxyethylcellulose having a viscosity of 30 Pas (determined as 2% strength solution in water at 25° C.); Natrosol® 250 HR from Hercules GmbH, Düsseldorf 2) 30% strength by weight aqueous solution of an ammonium polyacrylate; Pigmentverteiler [pigment dispersant] A from BASF AG, Ludwigshafen 3) Proxel®GXL from zeneca GmbH, Frankfurt 4) Foammaster®S from Henkel KGaA, Düsseldorf The following constituents were added with stirring:

190.10 g of titanium dioxide pigment[5]
181.60 g of feldspar[6] and
50.70 g of calcined kaolin[7]

5) Kronos®2101 from Kronos, Houston/Tex.
6) Minex®4 from Unimin Speciality Minerals Inc. Elco/ Illinois, average particle size 7.5 μm
7) Icecap® from Burgess Pigment Co., Sandersville, Ga.

The constituents were mixed for 20 minutes in a high-speed disperser. Then the following constituents were added with stirring:

266.01 g of polymer dispersion from I)
2.50 g of commercial defoamer[4]
11.80 g of commercial thickener[8]
159.00 g of water.

4) Foammaster®S from Henkel KGaA, Düsseldorf
8) 20% strength by weight solution of an associatively thickening polyurethane, Acrysol RM 2020 from Rohm and Haas Deutschland GmbH, Frankfurt The performance properties of the emulsion paints are summarized in Tables 3 and 4.

2. Solventless Interior Paint with a pvc of 75%, Formulation II (Comparative Examples C6 and C7 and Inventive Example 6)

A vessel was charged with the following constituents:

106.00 g of water
1.00 g of 20% strength by weight sodium hydroxide solution
3.00 g of 35% strength by weight solution of a sodium polyphosphate in water[22]
3.00 g of dispersing auxiliary[9]
3.00 g of preservative[10]
4.00 g of defoamer[11]
180.00 g of 2% strength by weight aqueous hydroxyethylcellulose solution[1]

22) Calgon® from BK Ladenburg, Ladenburg
9) 35% strength by weight aqueous solution of a sodium polyacrylate; Pigmentverteiler [pigment dispersant] NL from BASF AG, Ludwigshafen
10) Parmetol®A23 from Schulke & Mayr GmbH, Norderstedt
11) Agitan 280 from Münzing-Chemie GmbH, Heilbronn
1) Bydroxyethylcellulose having a viscosity of 30 Pas (determined as 2% strength solution in water at 25° C.); Natrosol® 250 HR from Hercules GmbH, Düsseldorf The following constituents were added with stirring:

65.00 g of titanium dioxide pigment[12]
5.00 g of aluminum silicates[13]
215.00 g of calcium carbonate, calcite (about 5 μm)[14]
55.00 g of calcium carbonate, precipitated, 0.3 μm[15]
95.00 g of calcium carbonate, chalk, 2.4 μm[16]
65.00 g of talc/dolomite, 6 μm[17].

12) Kronos®2043 from Kronos Titan GmbH, Leverkusen
13) Aluminum silicate P 820 from Degussa AG, Frankfurt
14) Calcite, average particle size 5 μm; Omyacarb 5GU from Omya GmbH, Cologne
15) Socal P2 from Deutsche Solvay GmbH, Solingen.
16) Omya Violette Etikette from Omya GmbH, Cologne
17) Talc/dolomite, average particle size 6 μm; Naiatsch SE-Micro from Luzenac Deutschland GmbH, Düsseldorf The components were mixed in a disperser, then the following constituents were added with stirring: 130.00 g of dispersion, 50% by weight, and 70.00 g of water.

The solids content of the paint was 57% by weight. The pigment volume concentration was 75%. The performance properties are summarized in Table 5.

3. Solventborne interior paint with a pvc of 81% formulation III (Comparative Examples C8 and C9 and Inventive Example 7)

A vessel was charged with the following constituents:

100.00 g of water
2.00 g of dispersing auxiliary[2]
7.00 g of aqueous solution of a sodium polyphosphate[22]
2.00 g of concentrated ammonia solution
3.00 g of preservatives[10]
150.00 g of 2% strength by weight aqueous methylhydroxyethylcellulose solution[18]
12.00 g of white spirit K 60[19] and
12.00 g of plasticizer[20].

2) 30% strength by weight aqueous solution of an ammonium polyacrylate; Pigmentverteiler [pigment dispersant] A from BASF AG, Ludwigshafen 22) Calgon® from BK Ladenburg, Ladenburg 10) Parmetol®A23 from Schulke & Mayr GmbH, Norderstedt 18) MN 20000 GB, Wolff Walsrode GmbH, Walsrode 19) Boiling range 180–210° C., Esso Chemie GmbH, Cologne.

20) Diisobutyl ester of a mixture of $C_4$–$C_6$ dicarboxylic acids, Lusolvan® FBH, BASF AG The following constituents were added with stirring:

71.00 g of titanium dioxide pigment[12]

12.00 g of aluminum silicate[13]

83.00 g of calcium carbonate, precipitated, 0.3 $\mu$m[15]

417.00 g of calcium carbonate, calcite 5 $\mu$m[14]

12) Kronos®2043 from Kronos Titan GmbH, Leverkusen

13) Aluminum silicate P 820 from Degussa AG, Frankfurt

15) Socal P2 from Deutsche Solvay GmbH, Solingen.

14) Calcite, average particle size 5 $\mu$m; Omyacarb 5GU from Omya GmbH, Cologne The components were mixed with one another in a high-speed mixer and then the following constituents were added with stirring:

4.00 g of wetting agent[21]

3.00 g of defoamer[11]

102.00 g of dispersion (50% by weight)

20.00 g of water.

21) Lumiten N-OC from BASF AG, 30% strength by weight solution of a fatty alcohol ethoxylate, cloud-point in aqueous sodium chloride solution: 90° C.

11) Agitan 280 from Münzing-Chemie GmbH, Heilbronn

The pvc of the paint was 81%. The results of performance testing are summarized in Table 6.

III. Determining the Performance Properties

1. Abrasion Resistance

For the formulation I the abrasion resistance was determined in accordance with ASTM D 2486 using a Gardner abrasion machine and a standardized abrasive medium (abrasive type SC-2).

The emulsion paints of formulation I were applied with a box-type coating bar (gap height 175 $\mu$m, 7 MIL) to Leneta sheets. The sheets were then dried in a climatically controlled chamber for 14 days under standard climatic conditions (23° C., 50% relative atmospheric humidity). The dry coat thickness was about 50 $\mu$m.

For each emulsion paint the abrasion test was carried out on 3 sheets. For this purpose, a metal strip 250 $\mu$m thick was placed underneath the center of the sheet. Abrasive paste was then applied, and abrasion was carried out with a nylon brush until the coating had been abraded right through at the point lying above the metal. The parameter indicated is the number of double strokes required to bring about this complete abrasion at one point. It is stated as the average of two values which deviate by less than 25%.

The emulsion paints of formulation II were tested for their abrasion resistance in accordance with DIN 53778 sheet 2; a 60 mm wide coating bar was used to apply a coating film to a Leneta sheet of approximately 430×80 mm. The gap height was chosen so as to give a dry coat thickness of 100 $\mu$m. The film was dried under standard climatic conditions for 28 days. Then an abrasion brush was guided over the coating in an abrasion device with continuous dropwise addition of a 0.25% strength aqueous solution of sodium n-dodecylbenzene-sulfonate. The number of double strokes until the coating was abraded right through was used as the parameter for the wet abrasion resistance.

The emulsion paints from III were likewise tested for their wet abrasion resistance in accordance with DIN 53778. In deviation from the above procedure, however, the formulation was applied in a wet coat thickness of 280 $\mu$m. The coating was dried at 50° C. for 2 days and then under standard climatic conditions for a further 5 days.

2. Blocking Resistance

The blocking resistance was determined in accordance with ASTM D 4946. For this purpose the emulsion paints from II were applied with a box-type coating bar (3 MIL, gap height 75 $\mu$m) to Leneta sheets. The sheets were then dried for 24 hours under standard climatic conditions. The dried and coated sheets were subsequently cut into 3.8 cm squares. The squares were placed on top of one another with the coated sides facing and were inserted between two glass plates. A weight of 2 kg was placed on top of these glass plates. This arrangement was stored at 50° C. for 24 hours. The sheets were then investigated for their parting behavior. The results were based on a rating scale from 0 to 10:

0=75 to 100% tearing of the coating

1=50 to 75% tearing

2=25 to 50% tearing

3=5 to 25% tearing

4=very tacky: 0 to 5% tearing;

5=moderate tack

6=slight tack

7=slight to very slight tack

8=very slight tack

9=barely any tack

10=no tack

3. Wet Adhesion

The wet adhesion was determined as follows: In a first step the Leneta sheets were coated with a solventborne alkyd resin lacquer (Glasurit EA, high-gloss lacquer from BASF deco GmbH, Cologne) using a box-type coating bar (gap height 180 $\mu$m). The sheets were dried for 24 hours in a standard-climate chamber and then in an oven at 50° C. for 14 days. The emulsion paints from II were then applied to the resin-coated Leneta sheets as a second coating, using an applicator (gap height 250 $\mu$m, 10 MIL). The resulting sheets were dried under standard climatic conditions for 3 days. Three test specimens were cut from each sheet. Each test specimen was scribed horizontally using a razorblade, and then a freeze/thaw test was conducted. For this test the specimens were wetted with water and subsequently stored in a deep freeze at −20° C. for 16 hours. This procedure was repeated twice. The samples were then allowed to warm to room temperature in water. Thereafter, the adhesion of the coating at the scribe mark was assessed by scratching with the fingernail, on the basis of a rating scale from 0 to 5, where 0 denotes optimal adhesion and 5 denotes no adhesion (flawless removal). The ratings 1 to 4 denote intermediate values.

TABLE 3

Performance testing of the formulation I (single-stage polymers)

| Example | Dispersion | Acid[1] [% by wt.] | MFT[2] [° C.] | Blocking resistance | Wet adhesion | Wet abrasion resistance |
|---|---|---|---|---|---|---|
| C1 | CD1 | MAA; 2 | 6.0 | 10 | 2 | 1200 |
| C2 | CD2 | IA; 2 | 4.0 | 10 | 2 | 1000 |
| C3 | CD3 | IA; 2 | 2.0 | 10 | 3 | 1325 |
| 1 | D1 | IA; 1 | 2.0 | 10 | 2 | 2000 |
| 2 | D2 | IA; 1 | 4.0 | 10 | 3 | 1700 |
| 3 | D3 | IA; 0.75 | 2.0 | 10 | 3 | 2200 |

[1]% by weight based on the overall weight of the polymer: MAA = methacrylic acid, IA = itaconic acid
[2]minimum film-forming temperature

TABLE 4

Performance testing of the formulation I (two-stage polymers)

| Example | Dispersion | Acid[1] [% by wt.] | MFT[2] [° C.] | Blocking resistance | Wet adhesion | Wet abrasion resistance |
|---|---|---|---|---|---|---|
| C4 | CD4 | AA; 0.75 | 13.0 | 9 | 3 | 1270 |
| C5 | CD5 | MAA; 0.75 | 10.0 | 10 | 3 | 1330 |
| 4 | D4 | IA; 0.75 | 9.0 | 10 | 3 | 2800 |
| 5 | D5 | IA; 0.5 AA; 0.25 | 12.0 | 10 | 4 | 2200 |

[1]% by weight, based on the overall weight of the polymer: AA = acrylic acid, MAA = methacrylic acid, IA = itaconic acid
[2]minimum film-forming temperature

TABLE 5

Performance testing of the formulation II

| Example | Dispersion | Acid [% by wt.][1] | Wet abrasion resistance |
|---|---|---|---|
| C6 | CD6 | AA; 1 | 2350 |
| C7 | CD7 | MAA; 1 | 2670 |
| 6 | D6 | IA; 1 | 4660 |

[1]% by weight, based on the overall weight of the polymer: AA = acrylic acid, MAA = methacrylic acid, IA = itaconic acid

TABLE 6

Performance testing of the formulation III

| Example | Dispersion | Acid [% by wt.][1] | Amide [% by wt.][2] | Wet abrasion resistance |
|---|---|---|---|---|
| C8 | CD8 | MAA; 2.6 | AM; 1.4 | 1320 |
| C9 | CD9 | AA; 2.6 | AM; 1.4 | 1336 |
| 7 | D7 | IA; 1.0 | — | 3113 |

[1]% by weight, based on the overall weight of the polymer: AA = acrylic acid, MAA = methacrylic acid, IA = itaconic acid
[2]% by weight, based on the overall weight of the polymer: AM = acrylamide

What is claimed is:

1. An emulsion paint, comprising:
   i) a polymeric binder, which comprises at least one copolymer P of ethylenically unsaturated monomers M in the form of an aqueous polymer dispersion;
   ii) at least one inorganic pigment;
   iii) an inorganic filler/extender; and
   iv) an auxiliary;

wherein said copolymer P has a glass transition temperature Tg in the range of from −10 to +50° C.; and
   wherein said copolymer P consists of the following units in polymerized form
   a) 20 to 80% by weight of at least one monomer M2a, whose homopolymer has a glass transition temperature of >30° C., and which is selected from the group consisting of styrene, α-methylstyrene, methyl methacrylate, ethyl methacrylate, n-propyl methacrylate, iso-propyl-methacrylate, n-butyl methacrylate, iso-butyl methacrylate, tert-butyl metracrylate, vinyl acetate, acrylonitrile and metacrylonitrile;
   b) 20 to 79.7% by weight of at least one monomer M2b, whose homopolymer has a glass transition temperature of <20° C. and which is selected from the group consisting of $C_1$–$C_{12}$-alkyl acrylates, butadiene, vinyl versatates, ethyl acrylate, n-butyl acrylate, and 2-ethylhexyl acrylate;
   c) 0.5 to 1.5% by weight of c1) a first acidic monomer M1 selected from the group consisting of itaconic acid, a salt of itaconic acid, an anhydride of itaconic acid, and mixtures thereof, or c2) mixtures of said first acidic monomer with 0 to 0.75% by weight of a second acidic monomer selected from the group consisting of acrylic acid and methacrylic acid, provided that a total amount of said first acidic monomer and said second acidic monomer is from 0.5 to 1.5% by weight, based on a total weight of said copolymer P; and a weight ratio of said second acidic monomer to said fit acidic monomer does not exceed 1:1; and
   d) 0.2 to 5% by weight of at least one monomer M3 having at least one urea group;
   wherein a sum of the amounts of monomers M1, M2a, M2b and M3 is 100% by weight;
   wherein said emulsion paint contains no cross-linking additive.

2. The emulsion paint according to claim 1, wherein itaconic acid is the sole acidic monomer M1.

3. The emulsion paint according to claim 1, wherein said aqueous dispersion of the copolymer P is obtained by free-radical aqueous emulsion polymerization of the monomers M using a monomer feed process in which all of said acidic monomer M1 is present in the monomer feed.

4. The emulsion paint according to claim 1, with a pigment volume concentration (pvc) >10%.

5. A method of improving the wet abrasion resistance of a polymer-bound coating composition, comprising:
   mixing a copolymer as a binder with said coating composition;
   wherein said copolymer consists of the following units in polymerized form
   a) 20 to 80% by weight of at least one monomer M2a, whose homopolymer has a glass transition temperature of >30° C., and which is selected from the group consisting of styrene, α-methylstyrene, ethyl methacrylate, n-propyl methacrylate, iso-propyl-metacrylate, n-butyl methacrylate, iso-butyl methacrylate, tert-butyl methacrylate, vinyl acetate, acrylonitrile and methacrylonitrile;
   b) 20 to 79.7% by weight of at least one monomer M2b, whose homopolymer has a glass transition temperate of <20° C., and which is selected from the group consisting of $C_1$–$C_{12}$-alkyl acrylates, butadione, vinyl versatates, ethyl acrylate, n-butyl acrylate, and 2-ethylhexyl acrylate;

c) 0.5 to 1.5% by weight of c1) a first acidic monomer M1 selected from the group consisting of itaconic acid, a salt of itaconic acid, an anhydride of itaconic acid, and mixtures thereof, or c2) mixtures of said first acidic monomer with 0 to 0,75% by weight of a second acidic monomer selected from the group consisting of acrylic acid and methacrylic acid, provided that a total amount of said first acidic monomer and said second acidic monomer is from 0.5 to 1.5% by weight, based on a total weight of said copolymer P; and a weight ratio of said second acidic monomer to said first acidic monomer does not exceed 1:1; and d) 0.2 to 5% by weight of at least one monomer M3 having at least one urea group;

wherein a sum of the amounts of monomers M1, M2a, M2b and M3 is 100% by weight;

wherein said binder and said coating composition contains no cross-linking additive.

6. The method according to claim 5, wherein the coating composition is an emulsion paint.

7. The emulsion paint as claimed in claim 1, wherein said second acidic monomer is present; and
wherein a total amount of said first acidic monomer and said second acidic monomer is from 0.5 to 1.0% by weight based on a total weight of said copolymer P; and
provided that a weight ratio of said monoethylenically unsaturated carboxylic acid to said acidic monomer does not exceed 1:1.

8. The emulsion paint as claimed in claim 1, wherein the aqueous dispersion of the copolymer P is obtained by free-radical aqueous emulsion polymerization of the monomers M using a monomer feed process in which all of the itaconic acid is present in the monomer feed.

9. The emulsion paint as claimed in claim 1, wherein the aqueous dispersion of the copolymer P is obtained by free-radical aqueous emulsion polymerization of the monomers M using a monomer feed process in which at least 50% by weight of acidic monomer M1 are present in the monomer feed.

10. The emulsion paint as claimed in claim 1, wherein the aqueous dispersion of the copolymer P is obtained by free-radical aqueous emulsion polymerization of the monomers M using a monomer feed process in which at least 50% by weight of the itaconic acid are present in the monomer feed.

11. The emulsion paint according to claim 1, with a pigment volume concentration (pvc) >40%.

12. The emulsion paint according to claim 1, with a pigment volume concentration (pvc) >60%.

13. The emulsion paint according to claim 1, wherein an amount of itaconic acid in said copolymer P is from 0.5 to 0.9% by weight, based on a total weight of said copolymer P.

14. The emulsion paint according to claim 1, wherein a weight ratio of said second acidic monomer to said first acidic monomer does not exceed 1:2.

15. The emulsion paint according to claim 1, wherein a weight ratio of said second acidic monomer to said first acidic monomer does not exceed 1:3.

16. The emulsion paint according to claim 1, wherein a weight ratio of said second acidic monomer to said first acidic monomer does not exceed 1:9.

17. The emulsion paint according to claim 1, further comprising, in copolymerized form, 0 to 1% by weight of monomers M4 which comprise siloxane groups.

18. The emulsion paint according to claim 17, wherein said monomers M4 are selected from the group consisting of vinyltrialkoxysilanes, alkylvinyldialkoxysilanes and (meth)acryloxyalkyltrialkoxysilanes.

19. The emulsion paint according to claim 1, having a wet abrasion resistance of from 1700 to 4660.

20. The emulsion paint according to claim 19, having a wet abrasion resistance of from 2800 to 4660.

21. An emulsion paint, comprising:
i) a polymeric binder, which comprises at least one copolymer P of ethylenically unsaturated monomers M in the form of an aqueous polymer dispersion;
ii) at least one inorganic pigment;
iii) an inorganic filler/extender; and
iv) an auxiliary;
wherein said copolymer P has a glass transition temperature Tg in the range of from −10 to +50° C.; and
wherein said copolymer P consists of the following units in copolymerized form
i) 20 to 80% by weight of at least one monomer M2a, whose homopolymer has a glass transition temperature of >30° C., and which is selected from the group consisting of styrene, α-methylstyrene, methyl methacrylate, ethyl methacrylate, ethyl methacrylate, n-propyl methacrylate iso-methacrylate, n-butyl methacrylate, iso-butyl methacrylate, tert-butyl methacrylate, vinyl acetate, acrylonitrile and methacrylonitrile;
ii) 20 to 79.7% by weight of at least one monomer M2b, whose homopolymer has a glass transition temperature of <20° C., and which is selected from the group consisting of $C_1$–$C_{12}$-alkyl acrylates, butadiene, vinyl versatates, ethyl acrylate, n-butyl acrylate, and 2-ethylhexyl acrylate;
iii) 0.5 to 1.0% by weight of itaconic acid as monomer M1; and
iv) 0.2 to 5% by weight of at least one monomer M3 having at least one urea group;
wherein a sum of the amount of monomers M1, M2a, M2b and M3 is 100% by weight;
wherein said copolymer P contains no polymerized acrolein;
wherein said emulsion paint contains no cross-linking additives.

22. The emulsion paint according to claim 21, wherein said monomer M2a is selected from the group consisting of methyl methacrylate, n-butyl methacrylate and styrene; and
wherein said monomer M2b is selected from the group consisting of $C_1$–$C_{12}$ alkylacrylates.

23. A method of improving a wet abrasion resistance of a polymer bound emulsion paint, comprising;
mixing an aqueous dispersion of a copolymer P as a binder into a latex paint which additionally comprises at least one inorganic pigment, an inorganic filler extender and an auxilliary;
wherein said copolymer P comprises in polymerized form
a) as monomer M 1:
0.5 to 1.0% by weight of an acidic monomer selected from the group consisting of itaconic acid, a salt of itaconic acid an anhydride of itaconic acid and a combination thereof, and
0 to 0.5% by weight of a second monomer selected from the group consisting of acrylic acid and methacrylic acid based on a total weight of said copolymer P;

provided that a total amount of said acidic monomer and said second monomer is from 0.5 to 1.0% by weight, based on the total weight of said copolymer P, and the weight ratio of said second monomer to said acidic monomer does not exceed 1:1;

b) 90 to 99.9% by weight of monomers M2 selected from the group consisting of vinylaromatic monomers, esters of ethylenically unsaturated $C_3$–$C_8$ monocarboxylic acids with $C_1$–$C_{12}$-alkanols, and vinyl esters of aliphatic $C_1$–$C_{12}$ monocarboxylic acids, based on a total amount of said copolymer P; and c) 0.1 to 10% by weight of at least one monomer M3 which comprises an urea group, based on the total weight of copolymer P; and wherein said aqueous polymer dispersion contains no polymerized acrolein;

ii) at least one inorganic pigment, iii) an inorganic filler or an inorganic extender; and iv) an auxiliary;

wherein said aqueous dispersion or said latex paint contains no cross-linking additive.

24. The method according to claim 23, wherein said copolymer P is the only binder.

25. The method according to claim 23, wherein said emulsion paint has a pigment volume concentration of >10%.

26. The method according to claim 23, wherein said emulsion paint has a pigment volume concentration of >40%.

27. The method according to claim 23, wherein said emulsion paint has a pigment volume concentration of >60%.

28. The method according to claim 23, wherein said copolymer P comprises in copolymerized form i) 20 to 80% by weight of at least one monomer M2a, whose homopolymer has a glass transition temperature of >30° C., and which is selected from the group consisting of styrene, α-methylstyrene, methyl methacrylate, ethyl methacrylate, n-propyl methacrylate, iso-propyl-methacrylate, n-butyl methacrylate, iso-butyl methacrylate, tert-butyl methacrylate, vinyl acetate, acrylonitrile and methacrylonitrile;

ii) 20 to 79.7% by weight of at least one monomer M2b, whose homopolymer has a glass transition temperature of <20° C.;

iii) 0.5 to 1.0% by weight of itaconic acid as monomer M1; and iv) 0.2 to 5% by weight of at least one monomer M3 having at least one urea group;

wherein a sum of the amounts of monomers M1, M2a, M2b and M3 is 100% by weight.

29. The method according to claim 23, wherein a wet abrasion resistance of from 1700 to 4660 is achieved.

30. The method according to claim 23, wherein a wet abrasion resistance of from 2800 to 4660 is achieve.

31. An emulsion paint, comprising:

i) a polymeric binder, which comprises at least one copolymer P of ethylenically unsaturated monomers M in the form of an aqueous polymer dispersion;

wherein said copolymer P has a glass transition temperature Tg in the range of from −10 to +50° C.; and wherein said copolymer P comprises in polymerized form a) as monomer M 1:

0.5 to 1.0% by weight of an acidic monomer selected from the group consisting of itaconic acid, a salt of itaconic acid an anhydride of itaconic acid and a combination thereof, and 0 to 0.5% by weight of a second monomer selected from the group consisting of acrylic acid and methacrylic acid based on a total weight of said copolymer P;

provided that a total amount of said acidic monomer and said second monomer is from 0.5 to 1.0% by weight, based on the total weight of said copolymer P, and the weight ratio of said second monomer to said acidic monomer does not exceed 1:1;

b) 90 to 99.9% by weight of monomers M2 selected from the group consisting of vinylaromatic monomers, esters of ethylenically unsaturated $C_3$–$C_8$ monocarboxylic acids with $C_1$–$C_{12}$-alkanols, and vinyl esters of aliphatic $C_1$–$C_{12}$ monocarboxylic acids based on a total amount of said copolymer P; and c) 0.1 to 10% by weight of at least one monomer M3 which comprises an urea group, based on the total weight of copolymer P; and wherein said aqueous polymer dispersion contains no polymerized acrolein;

ii) at least one inorganic pigment, iii) an inorganic filler or an inorganic extender; and iv) an auxiliary;

wherein said emulsion paint contains no cross-linking additive.

32. The emulsion paint according to claim 1, wherein said unit c1) is present.

33. The emulsion paint according to claim 1, wherein said unit c2) is present.

34. The emulsion paint according to claim 17, wherein said monomer M4 is present.

35. The emulsion paint according to claim 1, where said auxiliary is selected from the group consisting of wetting agents, thickeners, defoamers, preservatives, hydrophobizing agents, biocides, fibers, film-forming auxiliaries and solvent.

36. The emulsion paint according to claim 1, wherein said emulsion paint further comprises water.

37. The emulsion paint according to claim 31, wherein said monomers M comprise at least one monomer M2a, whose homopolymer has a glass transition temperature of >30° C., and which is selected from the group consisting of styrene, α-methylstyrene, methyl methacrylate, ethyl methacrylate, n-propyl methacrylate, iso-propyl-methacrylate, n-butyl methacrylate, iso butyl methacrylate, tert-butyl methacrylate, vinyl acetate, acrylonitrile and methacrylate; and at least one monomer M2b, whose homopolymer has a glass transition temperature of <20° C., and winch is selected from the group consisting of $C_1$–$C_{12}$-alkyl acrylates, butadiene, vinyl versatates, ethyl acrylate, n-butyl acrylate, and 2- ethylhexyl acrylate.

* * * * *

UNITED STATES PATENT AND TRADEMARK OFFICE
CERTIFICATE OF CORRECTION

PATENT NO.    : 6,790,272 B1
DATED         : September 14, 2004
INVENTOR(S)   : Cheng-Le Zhao et al.

It is certified that error appears in the above-identified patent and that said Letters Patent is hereby corrected as shown below:

Column 22,
Line 12, "metracrylate, vinyl acetate, acrylonitrile and metacrylonitrile" should read -- methacrylate, vinyl acetate, acrylonitrile and methacrylonitrile --;
Line 32, "to said fit acidic" should read -- to said first acidic --;
Line 59, "styrene, α-methylstyrene, ethyl" should read -- styrene, α-methylstyrene, methyl methyacrylate, ethyl --;
Line 61, "metacrylate, n-butyl" should read -- methacrylate, n-butyl --;
Line 67, "acrylates, butadione," should read --acrylates, butadiene --;

Column 24,
Line 26, "n-propyl methacrylate iso-methacrylate," should read -- n-propyl methacrylate, iso-propyl methacrylate --;
Line 62, "itaconic acid an" should read -- itaconic acid, an --;

Column 26,
Line 5, "itaconic acid an" should read -- itaconic acid, an --;
Line 57, "acrylonitrile and methacrylate; and" should read -- acrylonitrile and methacrylonitrile; and --.

Signed and Sealed this

Eighteenth Day of January, 2005

JON W. DUDAS
*Director of the United States Patent and Trademark Office*